Dec. 6, 1938.   A. B. CADMAN   2,138,837
ELECTROMAGNETIC FRICTION DEVICE
Original Filed July 6, 1936   2 Sheets-Sheet 1
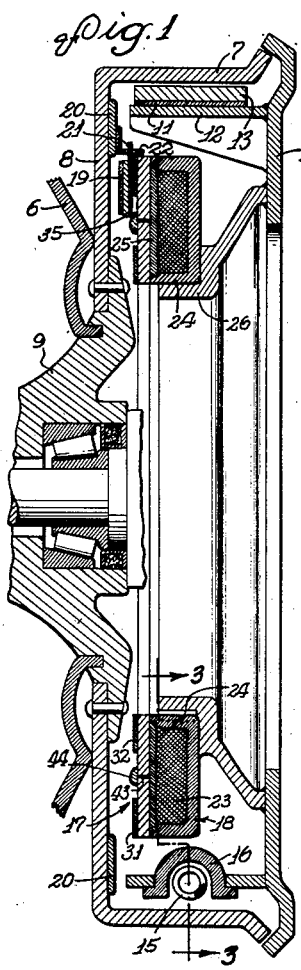
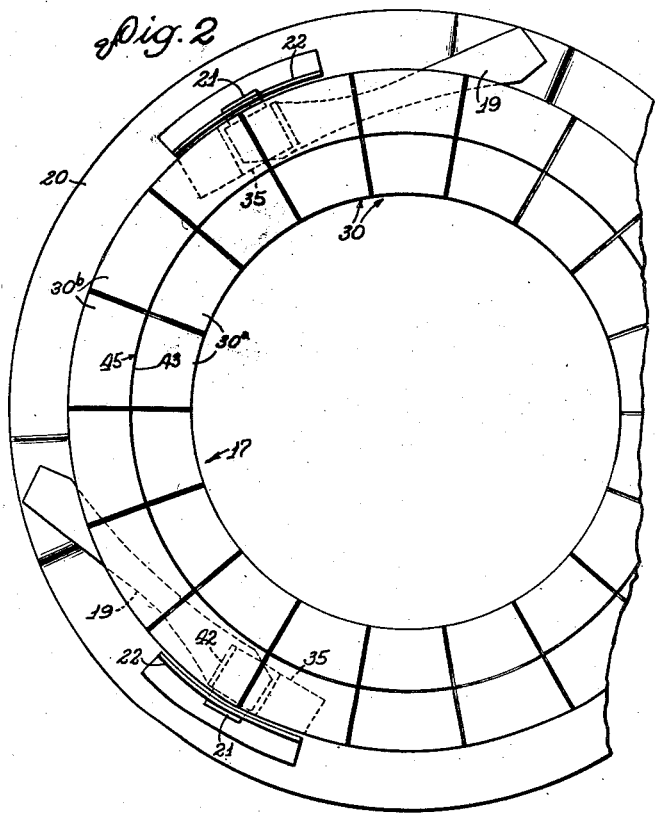
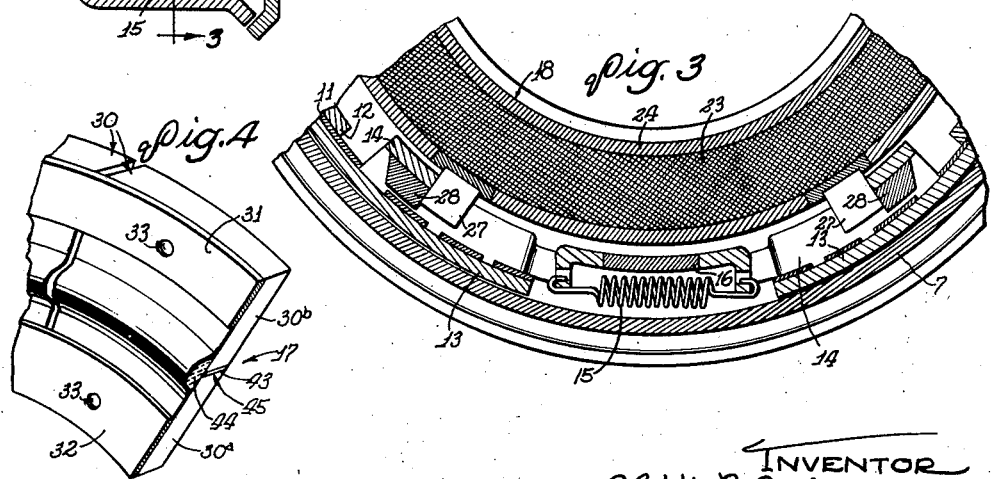

Dec. 6, 1938.  A. B. CADMAN  2,138,837
ELECTROMAGNETIC FRICTION DEVICE
Original Filed July 6, 1936   2 Sheets-Sheet 2

INVENTOR
Addi B. Cadman
By Parker, Carlson, Pitzner & Hubbard
ATTORNEYS

Patented Dec. 6, 1938

2,138,837

UNITED STATES PATENT OFFICE 2,138,837

ELECTROMAGNETIC FRICTION DEVICE

Addi Benjamin Cadman, Beloit, Wis.

Application July 6, 1936, Serial No. 89,094
Renewed February 28, 1938

16 Claims. (Cl. 188—138)

This invention relates to electromagnetic friction devices for brakes and clutches, and more particularly to those in which a frictional force is derived by electromagnetic attraction between a substantially flat annular armature ring and the concentric pole faces of a second ring carrying an electromagnetic winding.

The general object of the invention is to provide, in an electromagnetic friction device of the above character, a novel armature construction which is simple and inexpensive to manufacture, which eliminates the detrimental effect of residual magnetism, which enables the friction device to operate at maximum efficiency without the necessity of prolonged service use or wearing in of the parts, and which is not subject to objectionable distortion by the heat to which the armature is subjected in service.

The invention also resides in the novel construction of the armature by which manufacture is facilitated and a high degree of flexibility obtained in the construction of the armature as a unit.

Other objects and advantages of the invention will become apparent from the following detailed description taken in connection with the accompanying drawings, in which Figure 1 is a diametrical sectional view of an electric brake equipped with a friction device embodying the features of the present invention.

Fig. 2 is a face view of the armature unit constructed in accordance with the present invention.

Fig. 3 is a fragmentary sectional view taken substantially along the line 3—3 of Fig. 1.

Fig. 4 is a fragmentary perspective view looking toward the rear of the armature ring.

Figure 5:
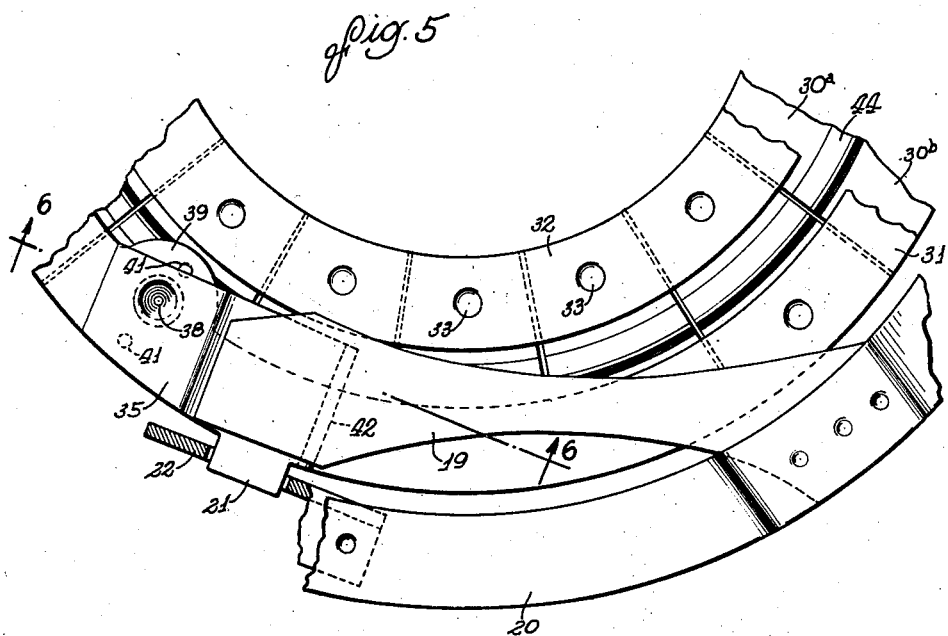
Fig. 5 is a fragmentary rear elevational view of the armature ring and its mounting.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawings, the invention is embodied in an electric brake for a vehicle wheel 6 including a rotatable drum 7 having the usual flange 8 bolted or otherwise secured to the wheel hub 9. The inwardly opening end of the drum is closed by an annular plate 10 suitably secured to a non-rotatable support (not shown). The non-rotatable friction element of the brake is of the band type comprising a metal strip 11 encircling inwardly projecting flange 12 on the anchor plate and carrying segments 13 of friction material. Fittings 14 are secured to the opposite ends of the strip 11 and drawn by a spring 15 into abutting engagement with the opposite end surfaces of a stop 16 rigid with the anchor plate.

The electromagnetic operator in which the present invention is embodied is utilized to spread the ends of the band apart and thereby set the brake. It comprises two rings 17 and 18 of magnetic material arranged concentric with the drum and adapted for axial gripping engagement. The ring 17, which will be described in detail later, constitutes the magnetic armature and is floatingly supported from the drum so as to rotate therewith and at the same time is adapted for some degree of axial movement. To this end, the back of the ring is secured at annularly spaced points to the ends of flexible metal strips 19 which extend in a substantially tangential direction and are spot welded at their other ends with a ring 20 in turn riveted to the drum flange 8. The strips 19 are tensioned to urge the armature ring 17 away from the drum flange and thereby maintain the face of the ring in constant light mechanical contact with the face of the magnet 18. The strips act in tension to prevent relative rotation between the rings 17 and 20 in one direction. Relative rotation in the other direction is prevented by engagement between lugs 21 rigid with the armature ring and flanges 22 rigid with the ring 20.

The ring 18 constitutes a magnetic core and is U-shaped in cross section with a winding 23 disposed between and enclosed by its two concentric poles 24 and adapted to be energized from a storage battery or other source of electrical power. Plates 25 of non-magnetic material are mounted between the poles and provide a wear resisting surface substantially flush with the end faces of the poles and adapted to sustain the axial pressure between the two magnetic rings. The magnet ring is supported for oscillation about the drum axis by a circular flange portion 26 of the anchor plate.

Projecting rigidly from the outer magnet pole are two actuating lugs 27 having oppositely facing surfaces positioned to abut against lugs 28 which are rigid with the fittings 14 on the brake band.

Upon movement of the magnet in either direction away from normal brake-released position (Fig. 3), one or the other of the lugs 27 will move its end of the brake away from the stop 16, thereby expanding the band and pressing its entire friction surface against the drum.

Such actuation of the band takes place whenever the winding 23 is energized with the wheel in motion. This produces a magnetic flux of high intensity in the closed magnetic circuit which encircles the winding through the opposite sections of the magnet core and armature. The resulting magnetic attraction causes gripping engagement between the friction surfaces of the two rings proportional to the strength of the energizing current, whereupon the magnet ring will be driven frictionally by the armature ring thereby moving with the wheel a short angular distance. In this circumferential movement, one end of the band is moved away from the stop 16 expanding the band and thereby pressing the segments 13 against the drum surface. After the normal clearance has been taken up, angular movement of the magnet ceases, causing slippage between the ring surfaces in the continued rotation of the wheel. When the current flow is interrupted, the spring 15, acting through the medium of the fitting 14 and the lug 27 serves to restore the magnet as well as the actuated end of the band to normal brake-released position.

Inasmuch as the friction faces of the rings 17 and 18 are constantly urged into light mechanical contact by the springs 19 while the winding 23 is deenergized, it is unncessary for the magnetic flux produced by the initial energization of the winding to overcome an air gap of any substantial width between the rings. As a result, the attractive force and, therefore, the degree of braking action is directly proportional to the strength of the energizing current.

Owing to the extremely low reluctance of the magnetic flux circuit which encircles each circumferential section of the winding 23, a magnet of the above character is capable of exerting a powerful attractive force which is an invariable function of the energizing current provided, however, that the coacting faces of the armature ring 17 and the poles 24 are in full contact. Unevenness of the armature surface or distortion thereof under the heat developed in service use will seriously impair the efficiency of the magnet as well as the controllability of the friction device as a whole.

The present invention contemplates a construction of the armature ring in which the tendency of the armature face to distort upon being heated is reduced to a minimum and which permits the active face of the ring to be formed with a high degree of flatness without adding to the manufacturing cost. To these ends, the armature ring is formed of relatively short segments 30 arranged circumferentially in end-to-end relation and flexibly connected together and supported in a manner such as to obtain a high degree of relative flexibility not only between the segments but of the parts of the individual segments and the parts by which the segments are interconnected. In order to obtain maximum stability in the flatness of the armature face in actual service use, I have discovered that a relatively large number of segments should be employed. Preferably, approximately eighteen segments are used but as used herein the terms "relatively large number" contemplates more than twelve segments.

For a purpose to appear later, each segment is composed of rigidly connected outer and inner portions 30ᵃ and 30ᵇ. To increase the relative flexibility between the segments, the segments are joined together by two concentric rings 31 and 32 of flat sheet metal lying against the backs of the segments and rigidly connected to the individual segments at single points of attachment. Preferably, these points are located midway between the edges of the rings and segment portions and between the radial edges of the latter, being formed by spot welds 33. With this form and location of the attachment means, an effective connection between the parts is formed without the possibility of causing uneven distortion of the connected parts. Since the welds are located along the radial center lines of the segments, the parts of the latter are free to flex relative to these lines thereby minimizing the distortion which has been found to be most detrimental in friction devices of the present character.

It has been found that the relative radial widths of the rings appreciably affect the ability of the armature to withstand heating without distortion of its active face, it being desirable to employ an inner ring of somewhat greater radial width than the outer ring. As shown herein, the rings are of such relative widths that their respective face areas are substantially equal.

Figure 6:
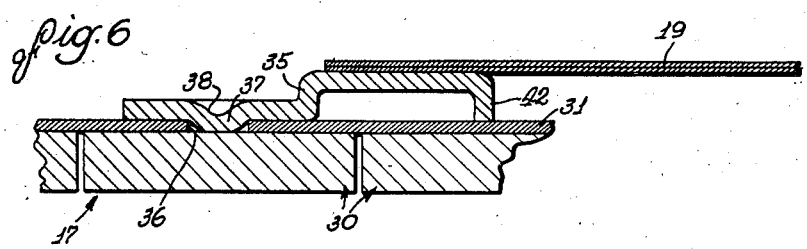
Fig. 6 is a fragmentary cross sectional view taken along the line 6—6 of Fig. 5.

To provide a connection between the ends of the springs and the back of the armature ring, which connection will withstand the torque to which the springs 19 are subjected and will at the same time permit freedom of relative flexing of the segments 30, the ends of the springs are secured as by welding to the ends of brackets 35 in the form of elongated metal strips extending substantially tangentially of the armature ring. The other end of each bracket is secured to the carrying ring 31 at a single point of attachment. For this purpose, a hole 36 (Fig. 6) is punched through the ring 31 to receive a punched out projection 37 of the bracket which, when the parts are assembled, projects into contact with the back of one segment 30. By applying a welding electrode in the depression 38, the bracket 35, the ring 31, and the segment 30 become firmly welded together at a single point. The portion of the ring 31 surrounding the projection 37 is enlarged as indicated at 39 (Fig. 5) so as to provide sufficient area for the welds 41 by which the opposite segment 30 may be attached to the enlarged portion of the ring 31. To prevent bending of the brackets 35 under the torque encountered during application of the brake, the end of each bracket opposite the weld is formed with a lateral projection 42 spaced circumferentially from the weld and bearing against the back surface of the ring 31.

By constructing the armature ring as above described of segments of relatively short circumferential length, by attaching these segments at single points near their center lines to the separate carrying rings 31 and 32 and by attaching the springs 19 to one of the rings at a single point, a high degree of flexure between any spaced points on the face of the armature is permitted with the result that the parts are free to expand and contract without substantial distortion of the friction face of the armature ring. Moreover, the parts are of simple construction and all can be made in stamping operations and readily assembled with the faces of the segments accurately disposed in a common plane. Through the use of armature rings of this construction, it has been found that the maximum efficiency of the magnetic friction device may be obtained at the outset without the necessity of wearing in the parts or of prolonged service use.

To eliminate the detrimental effect of residual magnetism in maintaining the friction faces in gripping engagement after the magnet is deenergized, a non-magnetic gap 45 on the order of a few thousandths of an inch in width is interposed in the magnetic circuit. For this purpose, each segment 30 is formed as above described in two parts 30ª and 30ᵇ separated by a thin ribbon 43 of non-magnetic material such, for example, as brass.

To secure the inner and outer parts of the segments together and provide a non-magnetic gap of uniform width without the necessity of heating the parts to a distorting temperature, the present invention contemplates the formation by arc welding of one or more beads 44 of non-magnetic material such as bronze along the backs of the segment parts 30ª and 30ᵇ and overlapping the adjacent edges of the latter. By employing electric arc welding to form the bead, a minimum amount of heat is required for welding, this being highly localized so that there is little danger of the active face of the segments becoming distorted. Since the welding heat is applied only to the backs of the segments, there is no possibility of scale being formed on the friction face so that no subsequent treatment of this face is required. Moreover, the parts of the segments may easily be held in the desired position while the bead is being formed with the result that a non-magnetic gap of uniform width is obtained.

I claim as my invention:

1. An electromagnetic friction device having a magnet and an armature therefor with cooperating flat annular faces, said armature comprising a plurality of segments arranged circumferentially in end-to-end relation, a flat ring rigidly attached to the back of each segment and having an enlarged portion with a hole therethrough opposite one of said segments, a bracket through the medium of which said armature is supported for axial movement, said bracket lying against said ring and having a projection extending through said hole and a weld formed on said projection rigidly uniting said bracket, said ring and said last mentioned segment at a single point of attachment whereby to permit independent flexure of said segment and said ring relative to said bracket.

2. An electromagnetic friction device having a magnet with concentric annular pole faces disposed in a common plane, an armature ring overlapping said pole faces and comprising a plurality of independently movable segments arranged circumferentially in end-to-end relation and a ring lying against the backs of said segments and rigidly attached to the individual segments whereby to permit relative flexing between the segments, a plurality of flat bars extending in tangential directions and lying against said ring at annularly spaced points therearound, one end of each of said bars being rigidly secured to said ring at a single point of attachment whereby to permit independent flexure of the ring relative to said bars, and means including a second ring rotatably supporting said armature from the other ends of said bars, said last mentioned ends having bearing engagement with said second ring.

3. An electromagnetic friction device having a magnet with concentric annular pole faces disposed in a common plane, an armature ring overlapping said faces and comprising a plurality of independently movable segments arranged circumferentially in end-to-end relation and a ring lying against the backs of said segments and rigidly attached to the individual segments whereby to permit relative flexing between the segments, a plurality of annularly spaced brackets each welded to said ring at a single point of attachment whereby to permit independent flexure of said brackets and said ring, and means rotatably supporting said armature through the medium of said brackets.

4. An electromagnetic friction device having a magnet and an armature therefor with cooperating annular faces, said armature comprising a plurality of ring segments arranged circumferentially in end-to-end relation and two thin metal rings concentrically arranged and disposed in a common plane, said rings being welded to the inner and outer portions of said segments at single points of attachment intermediate the ends of said segments and the sides of said rings.

5. An electromagnetic friction device having a magnet and an armature therefor with cooperating annular faces, said armature comprising a plurality of ring segments arranged circumferentially in end-to-end relation, a plurality of flat metal rings concentrically arranged and disposed in a common plane, and means rigidly connecting each of said rings and each of said segments at single points of attachment located midway between the radial side edges of said segments and midway between the sides of said rings.

6. An electromagnetic friction device having a magnet and an armature therefor with cooperating annular faces, said armature comprising a plurality of ring segments arranged circumferentially in end-to-end relation and two thin metal rings concentrically arranged and disposed in a common plane, and means rigidly joining each ring and the inner and outer portions of said segments at single points of attachment intermediate the ends of said segments and the sides of said rings, said inner ring being of greater radial width than said outer ring.

7. An electromagnetic friction device having a magnet and an armature therefor with cooperating annular faces, said armature comprising a plurality of ring segments arranged circumferentially in end-to-end relation and two thin metal rings concentrically arranged and lying against the backs of said segments and welds rigidly joining each of said rings and segments while permitting independent flexure of each segment and relative flexure between the segments.

8. An electromagnetic device having a magnet and an armature therefor with cooperating annular faces, said armature comprising a multiplicity of relatively movable independent segments and a relatively flexible ring secured to the back of each segment at a single point of attachment intermediate the edges of said ring and the four edges of said segments.

9. An electromagnetic device having a magnet and an armature therefor with cooperating annular faces, said armature comprising a multiplicity of relatively movable independent segments, a relatively flexible ring, and welds securing each segment to said rings at single points of attachment located midway between the edges of said ring and the radial edges of said segments.

10. An electromagnetic friction device having a magnet and a unitary armature ring therefor with cooperating annular faces, said armature ring comprising a relatively large number of independently movable segments.

11. An electromagnetic device having a magnet and a unitary armature ring therefor with cooperating annular faces, said armature ring comprising a relatively large number of segments independently movable relative to each other and each arranged for flexure relative to a single point of support.

12. An electromagnetic friction device having a magnet and an armature therefor with cooperating annular faces, said armature comprising a multiplicity, more than four, of segments mounted for independent relative movement.

13. An electromagnetic friction device having a magnet and an armature therefor with cooperating annular faces, said armature comprising a plurality of ring segments arranged in end-to-end relation and each divided into inner and outer concentric portions separated by a nonmagnetic radial gap of a width sufficient to overcome residual magnetism, and a bead of nonmagnetic metal electrically welded to the back of each segment and rigidly connecting the adjacent edges of said portions.

14. An electromagnetic friction device having a magnet and an armature therefor with cooperating flat annular faces, said armature comprising a plurality of ring segments arranged in end-to-end relation and each divided into inner and outer concentric portions separated by a nonmagnetic gap of narrow radial width, and nonmagnetic metal electrically welded to the back of each segment and overlapping the adjacent edges thereof whereby to rigidly unite the portions of each segment.

15. An electromagnetic friction device having a magnet and an armature therefor with cooperating annular faces, said armature comprising a plurality of segments arranged circumferentially in end-to-end relation, a strip of metal lying against the backs of said segments and supporting the same to permit of relative flexing between the individual segments, said strip having a hole therein opposite one of said segments, supporting means for said strip including a plate lying against the strip and having an integral projection extending through said hole, and a weld uniting said projection and said one segment whereby to provide a single point of support for the latter.

16. An electromagnetic friction device comprising a magnet having spaced pole faces and an armature adapted to overlap said faces, said armature comprising a relatively large number of plates of magnetic material arranged adjacent each other in end-to-end relation, and means attached to the individual plates at points spaced intermediate the edges thereof and rigidly joining the adjacent plates into a unitary assembly whereby to permit flexure of all parts of each plate relative to the point of support of the plate.

ADDI BENJAMIN CADMAN.